(12) United States Patent
Huang et al.

(10) Patent No.: US 12,480,793 B2
(45) Date of Patent: Nov. 25, 2025

(54) IN SITU ULTRASONIC FLOW METER VALIDATION

(71) Applicant: Baker Hughes Holdings LLC, Houston, TX (US)

(72) Inventors: Yufeng Huang, Andover, MA (US); Chong Tao, Winchester, MA (US); Daniel Robert Johnson, Tewksbury, MA (US); Aniruddha S. Weling, Wayland, MA (US); Anthony Kowal, Berlin, MA (US); Lei Sui, Winchester, MA (US)

(73) Assignee: Baker Hughes Holdings LLC, Houston, TX (US)

( * ) Notice: Subject to any disclaimer, the term of this patent is extended or adjusted under 35 U.S.C. 154(b) by 736 days.

(21) Appl. No.: 17/295,666

(22) PCT Filed: Nov. 27, 2019

(86) PCT No.: PCT/US2019/063534
§ 371 (c)(1),
(2) Date: May 20, 2021

(87) PCT Pub. No.: WO2020/112950
PCT Pub. Date: Jun. 4, 2020

(65) Prior Publication Data
US 2022/0018695 A1 Jan. 20, 2022

Related U.S. Application Data

(60) Provisional application No. 62/773,745, filed on Nov. 30, 2018.

(51) Int. Cl.
*G01F 1/667* (2022.01)
*G01F 25/10* (2022.01)

(52) U.S. Cl.
CPC .............. *G01F 1/668* (2013.01); *G01F 25/10* (2022.01)

(58) Field of Classification Search
CPC ................................. G01F 1/668; G01F 25/10
(Continued)

(56) References Cited

U.S. PATENT DOCUMENTS 7,290,450 B2 * 11/2007 Brown ................. G01N 29/036
73/861.23
2004/0011141 A1 1/2004 Lynnworth
(Continued)

FOREIGN PATENT DOCUMENTS

JP 08304135 A * 11/1996
JP 2008-507693 A 3/2008
(Continued)

*Primary Examiner* — Marrit Eyassu
(74) *Attorney, Agent, or Firm* — Mintz, Levin, Cohn, Ferris, Glovsky and Popeo, P.C.

(57) ABSTRACT

A method of in situ ultrasonic flow meter validation includes receiving data characterizing first signal diagnostics and data characterizing a first speed of a first acoustic signal through a gas mixture along a first path in a pipe. The first speed of the first acoustic signal is detected by a first channel of an ultrasonic flow meter including a first pair of transducers that are separated by a first path length of the first path. The gas mixture is configured to flow along a flow path in the pipe. The method also includes determining a status associated with the ultrasonic flow meter based on the data characterizing the first signal diagnostics and/or a difference between the first speed of the first acoustic signal and an independently calculated speed of sound. The speed of sound is calculated based on one or more properties of the gas mixture.

21 Claims, 5 Drawing Sheets

(58) Field of Classification Search
USPC .......................................................... 73/1.34
See application file for complete search history.

(56) References Cited

U.S. PATENT DOCUMENTS

| | | |
|---|---|---|
| 2009/0007625 A1 | 1/2009 | Ao et al. |
| 2011/0196624 A1* | 8/2011 | Hackett, III .......... G01F 15/068 |
| | | 702/45 |
| 2012/0204620 A1* | 8/2012 | Straub, Jr. ................. G01F 1/66 |
| | | 73/1.16 |
| 2013/0294475 A1* | 11/2013 | Derr .......................... G01F 1/66 |
| | | 374/1 |
| 2014/0109689 A1* | 4/2014 | Ramsay ................. G01F 1/662 |
| | | 73/861.28 |
| 2014/0111328 A1* | 4/2014 | Ramsay ................. G01F 25/10 |
| | | 340/511 |
| 2014/0303909 A1 | 10/2014 | Hanks et al. |
| 2016/0313160 A1* | 10/2016 | Ueberschlag ........ G01N 29/323 |
| 2019/0011300 A1* | 1/2019 | Gloss ...................... G01F 25/10 |
| 2019/0257685 A1* | 8/2019 | Lewis ..................... G01F 1/667 |

FOREIGN PATENT DOCUMENTS

| | | | |
|---|---|---|---|
| JP | 2012-509473 A | 4/2012 | |
| WO | WO-2013006090 A1 * | 1/2013 | ............... G01F 1/66 |
| WO | WO-2016210229 A1 * | 12/2016 | ............. G01F 1/667 |

\* cited by examiner

IN SITU ULTRASONIC FLOW METER VALIDATION

BACKGROUND

Ultrasonic measurement systems can be used to determine properties of a fluid flowing through a conduit (e.g., pipe). These systems can operate by creating an acoustic signal pulse, and transmitting the pulse through a fluid in a conduit, and receiving the signal after it has traveled along a path in the fluid. Two or more independent paths may be used (e.g., orthogonal mid-radius paths, or clockwise and counterclockwise paths) to transmit and receive acoustic pulses that can be indicative of sound speed, or of directional fluid flow rate. Important properties of the fluid can be determined as a function of the transit times of the acoustic signals.

It can be desirable to detect properties of fluid generated in an industrial process. For example, it can be desirable to determine the energy content or British thermal unit (BTU) value of a flare gas that can be indicative of combustion efficiency of the flare gas. For example, the U.S. Environmental Protection Agency (EPA) regulations can stipulate that the combustion efficiency of flare gas is periodically detected and shown to have a value in a desirable range. Combustion efficiency of the flare gas can be determined, for example, based on composition of the flare gas that can be measured by a gas analyzer (e.g., gas chromatograph or mass spectrometer). Alternately or additionally, combustion efficiency of the flare gas can be calculated from the speed of sound (e.g., an acoustic signal) in the flare gas.

SUMMARY

Various aspects of the disclosed subject matter may provide one or more of the following capabilities. The in situ ultrasonic flow meter validation system can allow for an automatic diagnostic test of an ultrasonic flow meter and verify its accuracy. In some implementations, the automatic diagnostic test can determine that the flow meter requires maintenance (e.g., flow meter path needs to be readjusted or transducers need to be checked) and can notify maintenance personnel. In some implementations, the automatic diagnostic test can determine that an undesirable operation of the flow meter can be resolved in situ (e.g., without the removal of the flow meter from a pipe), and can recalibrate the flow meter. The in situ ultrasonic flow meter validation system can enable end users to meet compliance requirements, reduce unnecessary downtime and reduce operational costs. It can allow for tracking the operation of the flow meter over a period of time that can allow for faster maintenance and timely replacement of the flow meter.

A method of in situ ultrasonic flow meter validation includes receiving data characterizing first signal diagnostics and data characterizing a first speed of a first acoustic signal through a gas mixture along a first path in a pipe. The first speed of the first acoustic signal is detected by a first channel of an ultrasonic flow meter including a first pair of transducers that are separated by a first path length of the first path. The gas mixture is configured to flow along a flow path in the pipe. The method also includes determining a status associated with the ultrasonic flow meter based on the data characterizing the first signal diagnostics and/or a difference between the first speed of the first acoustic signal and a calculated speed of sound. The speed of sound is calculated based on one or more properties of the gas mixture. The method further includes providing a notification including the determined status to a user and/or saving the notification to an electronic storage.

One or more of the following features can be included in any feasible combination.

In one implementation, the method further includes receiving data characterizing one or more properties of the gas mixture. The one or more properties includes one or more of composition of the gas mixture, pressure of the gas mixture in the ultrasonic flow meter, and temperature of the gas mixture; and calculating, using a predetermined algorithm, the speed of sound based on the data characterizing the one or more properties of the gas mixture. In another implementation, the predetermined algorithm includes one or more of a molecular-weight based algorithm, an AGA10 method and an ideal gas law. In yet another implementation, the status includes an identity of the ultrasonic flow meter.

In one implementation, the data characterizing the first signal diagnostics includes one or more of the first path length, time delay of a first transducer and/or a second transducer of the first pair of transducers and a signal strength, and a signal-to-noise ratio. The data characterizing the first speed of the first acoustic signal includes a first upstream time of travel of sound from the first transducer to the second transducer, and a first downstream time of travel of sound from the second transducer to the first transducer.

In one implementation, the method further includes receiving data characterizing second signal diagnostics and data characterizing a second speed of a second acoustic signal through a gas mixture along a second path in the pipe. The second speed of the second acoustic signal is detected by a second channel of the ultrasonic flow meter including a second pair of transducers that are separated by a second path length of the second path. The data characterizing the second signal diagnostics includes one or more of the second path length, time delay of a third transducer and/or a fourth transducer of the second pair of transducers, a signal strength and a signal-to-noise ratio. The data characterizing the second speed of the second acoustic signal includes a second upstream time of travel of sound from the third transducer to the fourth transducer, and a second downstream time of travel of sound from the fourth transducer to the third transducer.

In one implementation, determining the status includes determining that one or more of the first signal diagnostics of the first acoustic signal has a first predetermined value, the second signal diagnostics of the second acoustic signal has a second predetermined value, the difference between the first speed of the first acoustic signal and the calculated speed of sound is above a higher threshold value, and a difference between the second speed of the second acoustic signal and the calculated speed of sound is above the higher threshold value. Determining the status further includes setting the status associated with the ultrasonic flow meter to indicate a maintenance request.

In one implementation, determining the status includes determining that one or more of the first signal diagnostics of the first acoustic signal has a first predetermined value, the second signal diagnostics of the second acoustic signal has a second predetermined value, the difference between the first speed of the first acoustic signal and the calculated speed of sound is below a higher threshold value and above a lower threshold value, and a difference between the second speed of the second acoustic signal and the calculated speed of sound is below the higher threshold value and above the lower threshold value. Determining the status further includes setting the status associated with the ultrasonic flow meter to indicate that the ultrasonic flow meter requires calibration. In another implementation, the method further includes calibrating the ultrasonic flow meter by varying one or more of time delay of the first transducer and/or the second transducer, the first path length, time delay of the third transducer and/or the fourth transducer, and the second path length.

In one implementation, determining the status includes determining that one or more of the first signal diagnostics of the first acoustic signal has a predetermined value, the difference between the first speed of the first acoustic signal and the calculated speed of sound is below a lower threshold value, and a difference between the second speed of the second acoustic signal and the calculated speed of sound is below the lower threshold value. Determining the status further includes setting the status associated with the ultrasonic flow meter to indicate that the ultrasonic flow meter performance has been validated.

In one implementation, determining the status includes calculating a first velocity of fluid flow based on time difference between the first upstream time of travel and the first downstream time of travel. Determining the status also includes calculating a second velocity of fluid flow based on time difference between the second upstream time of travel and the second downstream time of travel. Determining the status further includes calculating a difference between the first fluid velocity and the second fluid velocity is above a higher threshold value; and setting the status associated with the ultrasonic flow meter to indicate a maintenance request.

In one implementation, determining the status includes calculating a first velocity of fluid flow based on time difference between the first upstream time of travel and the first downstream time of travel. Determining the status also includes calculating a second velocity of fluid flow based on time difference between the second upstream time of travel and the second downstream time of travel. Determining the status further includes calculating a difference between the first fluid velocity and the second fluid velocity is below a lower threshold value; and setting the status associated with the ultrasonic flow meter to indicate a successful in situ validation. In another implementation, the notification includes the determined status in a flare application or industrial process application.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Industrial processes can generate one or more fluids (e.g., as a by-product or waste). It can be desirable to determine the composition of the generated fluids. For example, generation and environmental disposition of flare gas (which can be generated during oil and natural gas production) may need to be regulated to ensure that the composition of the flare emissions complies with industry standards (e.g., EPA regulations). An ultrasonic flow meter can determine the speed of sound through a fluid (e.g., flare gas) in an industrial machine/pipeline. The speed of sound can be used to determine properties (e.g., composition, flow velocity, etc.) of the fluid. Speed of sound measurements can be validated via ex situ methods that require uninstalling the flow meter (or transducers therein) from the industrial machine/pipeline. This can require making provisions for access to maintenance personnel in hazardous areas and cause machine/pipeline down time which can result in loss of productivity. Furthermore, calibration of transducers under actual process conditions of fluid composition, pressure and temperature may be difficult to accomplish in an ex situ validation system, which can limit the accuracy of the latter. Accordingly, in situ ultrasonic flow meter validation systems and corresponding methods are provided that can validate the operation of the ultrasonic flow meter without uninstalling it from the industrial machine/pipeline.

The flow meter can include one or more transducers that can generate/receive acoustic signals that can travel through a volume of fluid in an industrial machine. In some implementations, the speed of sound can be detected based on the time taken by acoustic signals to traverse a known path length in the fluid. The path length can be set to a predetermined value at the time of installation of the flow meter (e.g., installation on a pipe), which can be stored in a computing device. The path length can vary over time (e.g., due to stress/strain on the flow meter, change in temperature, error in installation, etc.), which can lead to an error in the determination of speed of sound. Time taken by an acoustic signal to traverse the path length can depend on the flow of the fluid (e.g., average flow of the fluid in the pipe). Acoustic signals traveling along different paths (e.g., paths that have different orientation with respect to the direction of fluid flow) can have different traversal times. For example, an acoustic signal traveling along the direction of the fluid flow will traverse a given distance faster than if it were traveling against the fluid flow direction.

Transducer time delay (Tw) can be another factor that may be considered during in situ validation. Tw can be determined in the factory and it can be unique for each transducer. Tw can be affected by temperature and/or buildup of impurities on transducer surface in the pipeline. The relationship between Tw and temperature can depend on transducer type. Sometimes, Tw may need to be adjusted in the field during flow meter validation if path length is known (e.g., confirmed).

The in situ ultrasonic flow meter validation system can execute diagnostic tests to detect a change in the path length of flow meter. This can be done by comparing the speed of sound detected by the flow meter and a speed of sound calculated based on properties of the fluid (e.g., composition of the fluid, pressure exerted by the fluid near the flow meter, temperature of the fluid, and the like). In some implementations, the validation system can notify a designated personnel that the flow meter requires maintenance (e.g., when the difference between the detected and calculated sound speeds is greater than a threshold value). Based on the notification (e.g., a message sent to the designated personnel's computing device), the designated personnel can address the maintenance request. In some implementations, the validation system can execute corrective measures to identify and address undesirable operation of the flow meter (e.g., change in the path length and/or transducer time delay (Tw)). For example, the validation system can execute diagnostic tests on the electronic components (e.g., transducers) of the flow meter and modify the operation of the electronic components, such as transducer time delay (Tw). In some implementations, the validation system can also adjust the path length parameter of the flow meter if the path length changes from a predetermined value (e.g., when the difference between the path length and a predetermined value exceeds a threshold value). The validation system can generate a report of the diagnostic tests and provide the report to an operator and save the report to a data storage device for record keeping. Alternately, the validation system can generate a notification that indicates that the flow meter is operating as desired (e.g., when the difference between the detected and calculated speeds is smaller than a threshold value).

Figure 1:
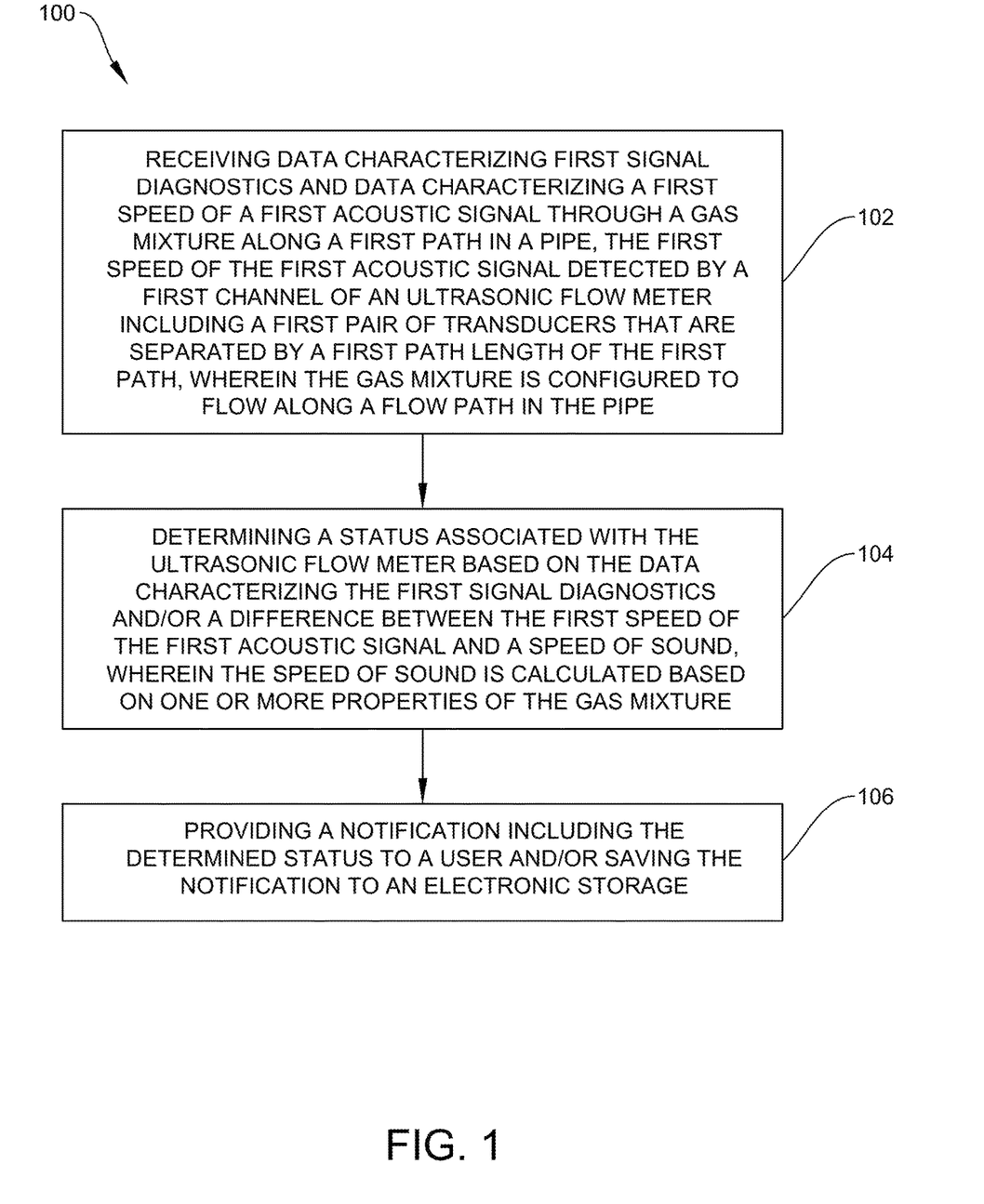
FIG. 1 is a flow chart of an exemplary method for in situ ultrasonic flow meter validation.
Figure 2:
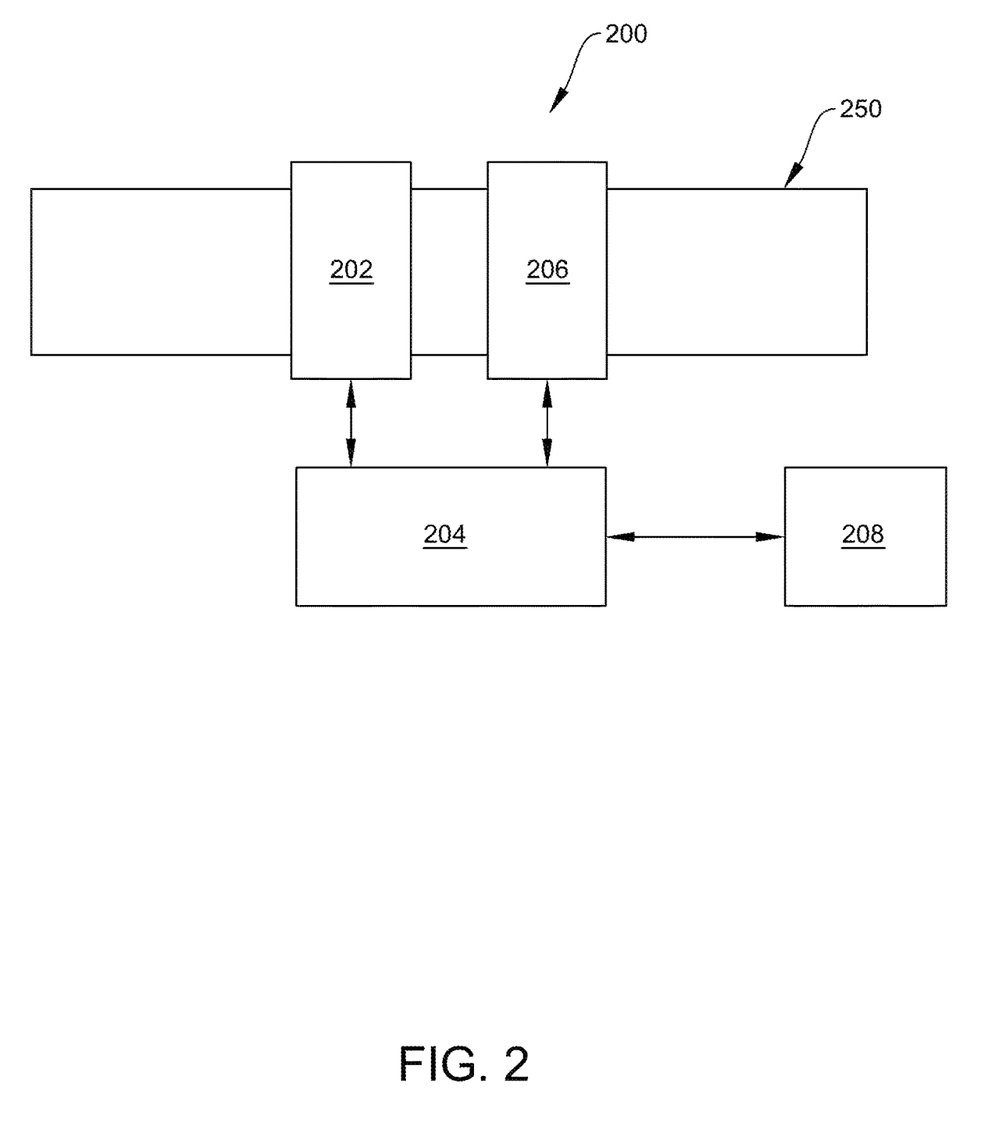
FIG. 2 is a schematic illustration of an exemplary in situ validation system.

FIG. 1 is a flow chart of an exemplary method for in situ ultrasonic flow meter validation. At 102, data characterizing a first speed of acoustic signal and/or its diagnostics through a gas mixture along a first path in a pipe can be received (e.g., by a computing device). The first speed of acoustic signal can be measured by a first channel of a flow meter coupled to the pipe that can include a pair of transducers separated by a pre-determined path length. The first channel can be arranged along the first path and the gas mixture in the pipe can flow along a flow path. The first path of the acoustic signal and the flow path can be oriented at an angle or can be parallel relative to each other. FIG. 2 is a schematic illustration of an exemplary in situ validation system 200 that can include a flow meter 202 configured to detect the first speed of acoustic signal through a gas mixture flowing through the pipe 250. The in situ validation system 200 can include a computing device 204 that can receive data characterizing the detected first speed of acoustic signal.

Figure 3:
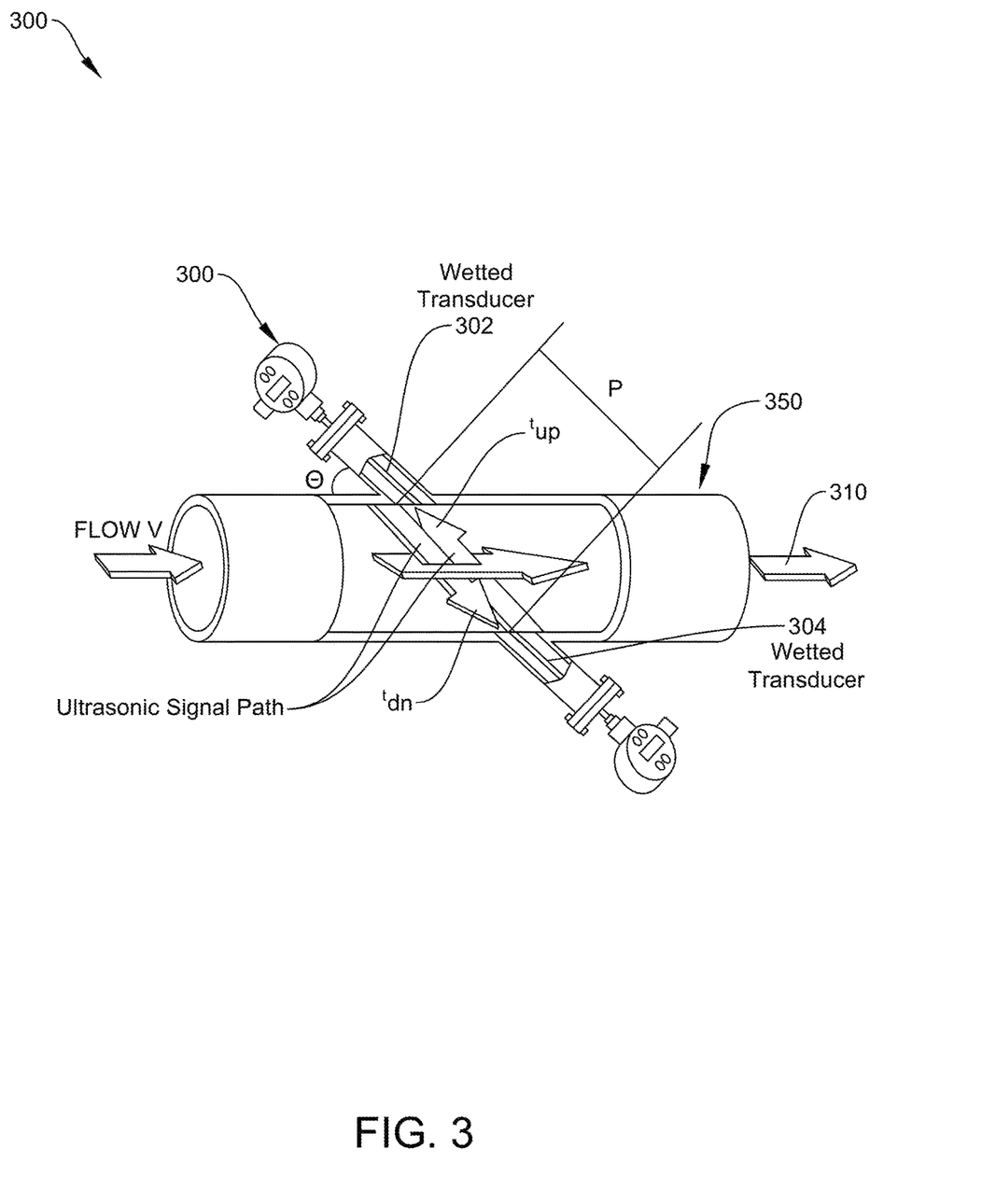
FIG. 3 is an illustration of an exemplary flow meter having a single channel coupled to a pipe.

FIG. 3 illustrates an exemplary flow meter 300 coupled to a pipe 350. The flow meter 300 can include a first channel with a pair of transducers 302 and 304 that can be separated by a path length P that can extend across the pipe (e.g., across the diameter of the pipe). A fluid (e.g., a gas mixture) can flow through the pipe 350 along a flow path 310. The transducers 302 and 304 can be configured to transmit and/or receive an acoustic signal (e.g., an acoustic pulse). The flow meter can include a detection system that can measure the time taken for an acoustic signal (or a sound wave) to travel along the path length P (e.g., from transducer 302 to transducer 304, or vice-versa). The time of travel of the acoustic signal can depend on the velocity of fluid flow along the flow path 310. For example, the time of travel of sound waves along an upstream direction (e.g., against flow of fluid from transducer 304 to transducer 302) can be larger than the time of travel of sound wave along a downstream direction (e.g., along the flow of fluid from transducer 302 to transducer 304). Based on the time of travel (e.g., upstream travel time, downstream travel time, etc.) and the path length between the transducers, the first speed of acoustic signal can be determined. The path length can be predetermined (e.g., can be set to predetermined value when the flow meter is installed on the pipe 350). However, the path length can vary (e.g., due to stress/strain on the flow meter, change in temperature, error in installation, etc.). This can lead to an error in the determination of the speed of acoustic signal (e.g., first speed of acoustic signal). Transducer time delay (Tw) can be set to a predetermined value. Tw can change (e.g., due to temperature change and/or human error) and may need to be adjusted. The gas mixture can flow through the pipe 350. In some implementations, data characterizing the first speed received by the computing device (e.g., computing device 204) can include the path length (e.g., path length P), time of travel of the acoustic signal along the path length, and the like.

Figure 4:
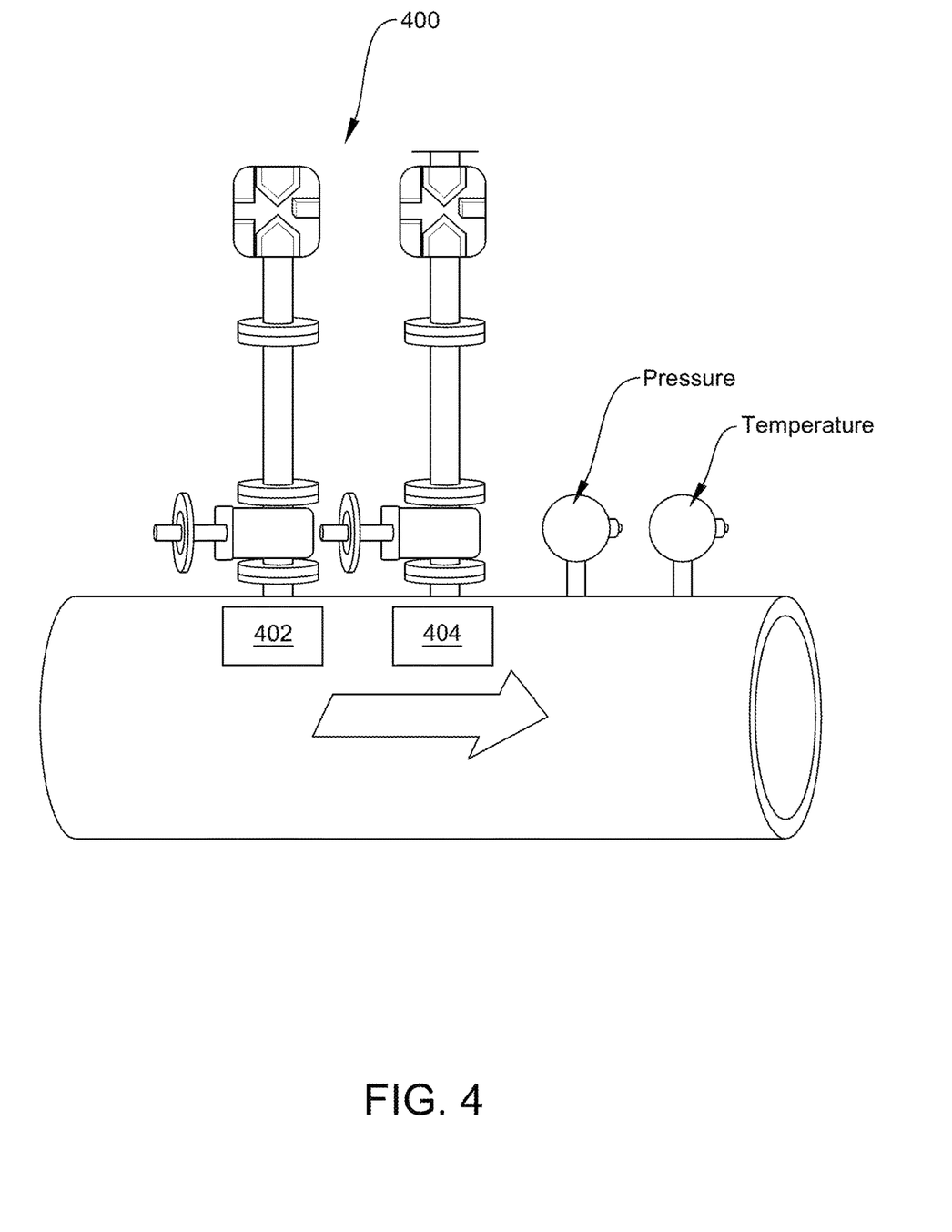
FIG. 4 is an illustration of another exemplary flow meter coupled to a pipe.

FIG. 4 illustrates another implementation of the flowmeter 400. In this implementation, transducer mounting fixtures are installed on top of the pipe, and the transducers 402 and 404 are turned 90 degrees inside the pipe facing each other. This configuration offers the flexibility of implementing different path lengths for the same pipe. This configuration can be needed for larger pipe sizes or for measuring flow of fluids with large attenuation of acoustic signal transmission because the path length could be too long for the exemplary flow meter 300 described FIG. 3.

In some implementations, the ultrasonic flow meter can include two channels where each of the two channels can independently transmit and detect acoustic signals. It can be desirable to include two channels as it can allow for more accurate detection of flow of fluid (e.g., effective fluid velocity along the fluid path) in the pipe. Time taken by an acoustic signal to travel through a flowing fluid can vary based on the velocity of the fluid flow relative to the direction of travel of the acoustic signal. For a given channel, the time taken by the acoustic signal to travel upstream (e.g., from transducer 304 to transducer 302) can be different from the time taken to travel downstream (e.g., from transducer 302 to transducer 304). Alternately, time of travel of acoustic signal can vary between channels depending on the path length and the profile of the fluid velocity within the pipe.

Determining the flow of fluid (e.g., fluid velocity) can improve the validation of the ultrasonic flow meter (e.g., measurement accuracy). For example, it can be desirable to prevent the flow of fluid in the pipe from exceeding a threshold value. Ultrasonic flow meters with two channels can allow for more accurate detection of the flow of fluid which can result in improved monitoring of the industrial process by the ultrasonic flow meter. In some implementations, each of the two channels can detect the velocity of fluid flow (e.g., average fluid velocity across a cross-section of the pipe) based on difference between upstream and downstream travel time of the acoustic signal. If the difference between the velocities of fluid flow detected by the two channels is below a threshold value, measurements by the ultrasonic flow meter can be deemed acceptable. Additionally or alternatively, two or more channels can improve the robustness of the ultrasonic flow meter (which can be desirable for critical applications), reduce measurement uncertainties (e.g., by improving time resolution of acoustic signal detection), reduce uncertainty in determination of asymmetric flow profile of the fluid, etc.

Figure 5:
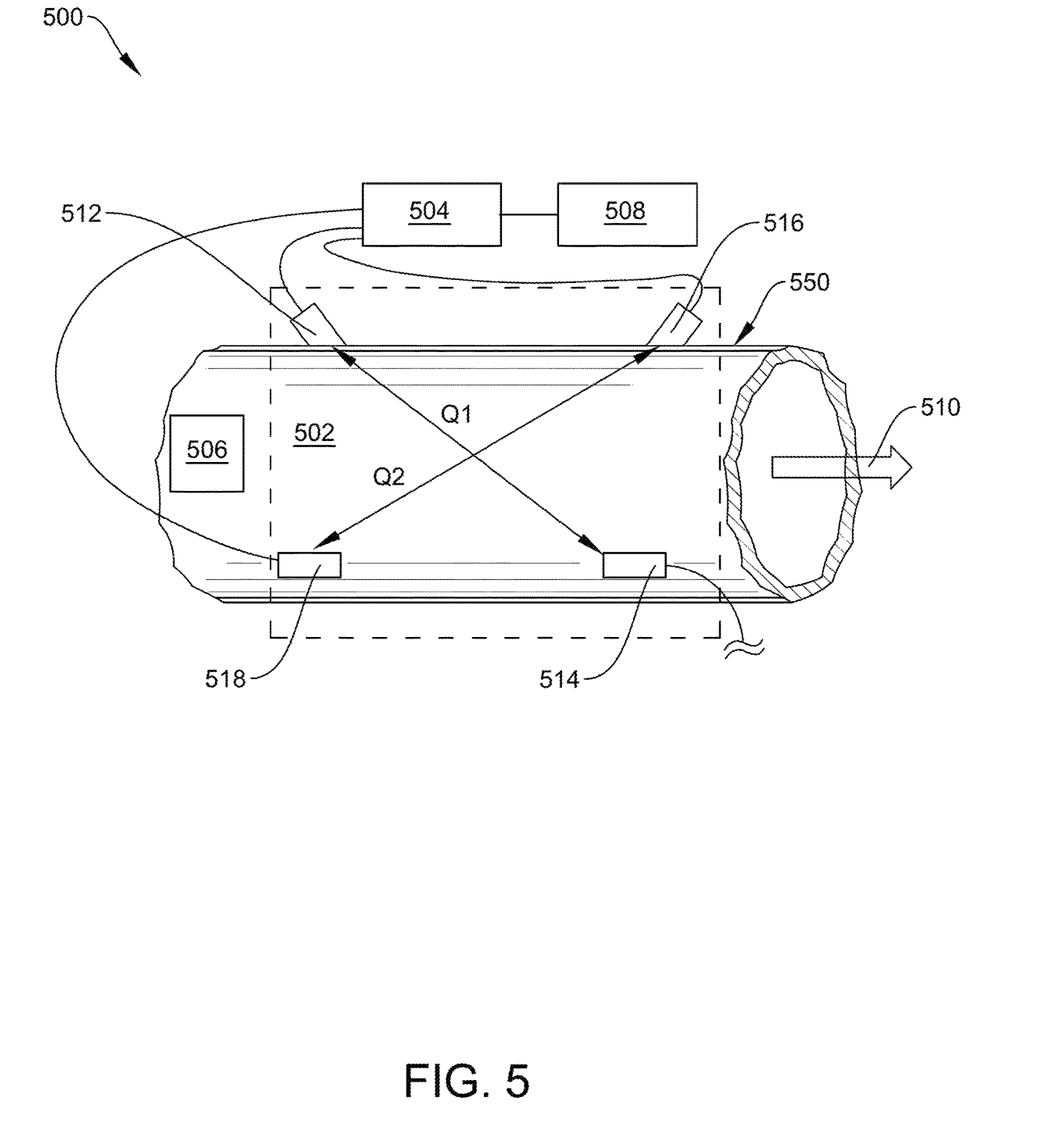
FIG. 5 is an illustration of an exemplary validation system with a flow meter having two channels coupled to a pipe.

FIG. 5 is an illustration of an exemplary validation system 500 including a flow meter 502 having two channels and an analysis system 506. The flow meter 502 and the analysis system 506 can be coupled to a pipe 550. The pipe 550 can include a fluid flowing along the flow path 510. The flow meter 502 can include a first channel with a pair of transducers 512 and 514 that can be separated by a first path (having path length Q1) and a second channel with a pair of transducers 516 and 518 that can be separated by a second path (having path length Q2). The transducers 512, 514, 516 and 518 can be in communication with a computing device 504 (e.g., can transmit the time of transmission/detection of acoustic signals). For each channel, the upstream and the downstream traversal times can be detected. Upstream/downstream velocity can be determined by dividing the path length with the upstream/downstream traversal time. The fluid velocity can be determined from the difference between the upstream and downstream velocities. For example, fluid velocity can be calculated for each of the two channels. The computing device 504 can receive data characterizing the speed of acoustic signal in the first and second channels (e.g., upstream/downstream time of travel of sound waves along the first and second paths) and its signal diagnostic (e.g., first/second path length, time delay of transducers 512, 514, 516, 518, etc.).

The in situ validation system 200 (or 500) can also include a gas mixture analyzer ("analysis system") 206 (or analysis system 506) that can measure various properties of the gas mixture in the pipe 250 (or pipe 550) and provide information related to the measured properties to the computing device 204 (or computing device 504). For example, the analysis system 206/506 can include a gas analyzer (e.g., gas chromatograph, mass spectrometer, etc.) that can detect the composition of the gas mixture in the pipe 250/550. The analysis system can include a pressure detector and/or a temperature detector that can measure the pressure and temperature of the gas mixture, respectively. The analysis system 206/506 can transmit data characterizing one or more properties of the gas mixture (e.g., composition/pressure/temperature of the gas mixture) to the computing device 204/504. The computing device 204/504 can receive the data and calculate the speed of sound in the gas mixture (e.g., in gas mixture independent of its flow rate) based on the received data. The speed of sound can be calculated using a predetermined algorithm.

In some implementations, the predetermined algorithm can receive data characterizing one or more properties of the gas mixture, and can output the second speed of acoustic signal. The predetermined algorithm can include a molecular-weight based algorithm (e.g., as described in U.S. Pat. No. 6,216,091). The molecular-weight based algorithm can be based on a database of constants of hydrocarbon mixtures as a function of average molecular weight of the hydrocarbon mixture. The molecular-weight based algorithm can be configured to iteratively set a hypothetical molecular weight, determine the corresponding critical properties, and compute a predicted sound speed. If the two speeds differ, a new weight is set and the procedure is repeated until the predicted sound speed matches the measured speed, indicating that the current estimate is the correct average molecular weight.

The predetermined algorithm can include an AGA10 method and/or Ideal Gas Law. AGA10 can be used for hydrocarbons in the natural gas industry (e.g., from alkane group (C—C), such as methane or ethane). AGA10 can take alkane gas compositions as inputs. Flare gases are products of various chemical processes in refineries and petrochemical plants and their compositions can be very complex. Besides gases from the alkane group, flare gas can include gases from the alkene group (C=C), such as ethylene or propylene. In some implementations, the molecular-weight based algorithm is a preferred algorithm for flare application because it can cover a much wider range of gases. The Ideal Gas Law can be used when process pressure is very close to ambient pressure. In some implementations, at higher pressure, sound speed calculated using Ideal Gas Law yields higher error. For example, at 10 PSIG pressure, sound speed error using Ideal Gas Law can be +/−1% for some gases, which is a sizeable fraction of the ultrasonic flow meter accuracy for ultrasonic flow meter validation purpose.

Returning to FIG. 1, at 104, the computing device 204/504 can determine a status associated with the flow meter (e.g., flow meter 202, 502, etc.) based on signal diagnostics of the first acoustic signal and/or a difference between the first speed of acoustic signal and the calculated speed of sound. In some implementations, the status can indicate that the flow meter requires maintenance (e.g., the path length of the flow meter needs to be adjusted and/or transducers need to be checked). This can be done, for example, when signal diagnostics of the first acoustic signal are not acceptable (e.g., signal diagnostics do not have a predetermined value/range of values) and the difference between the first speed of acoustic signal and the calculated speed of sound (e.g., absolute value of the difference) is above a higher threshold value. For validation system 500, the computing device 504 can calculate a first speed difference between the speed of acoustic signal in the first channel and the calculated speed of sound, and a second speed difference between the speed of acoustic signal in the second channel and the calculated speed of sound. The status of the flow meter 504 can be based one or both of the calculated differences (e.g., when one or both of the calculated speed differences is above the higher threshold value). The higher threshold value can be predetermined (e.g., programmed into the computing device 204 by a personnel). A lower threshold value can be predefined (e.g., based on flow meter 202 characteristics, when error in the flow reading is due to sound speed error, etc). Lower threshold can be determined from flow meter 202 configuration and installation tolerance.

In some implementations, if signal diagnostics of the first acoustic signal are acceptable (e.g., signal diagnostics have a predetermined value/range of values) and the difference between the first speed of acoustic signal and the calculated speed of sound (or the first speed difference and/or the second speed difference in the two channels of flow meter 502) is below the lower threshold, validation is considered a pass and no adjustment is required. If signal diagnostics of the first acoustic signal are acceptable (e.g., signal diagnostics have a predetermined value/range of values) and/or the difference between the first speed and calculated speed of sound (or the first speed difference and/or the second speed difference in the two channels of flow meter 502) is between the lower threshold and the higher threshold, the computing device 204 (or 504) can send a signal to flow meter 202 (or 502) to perform an in situ sound speed calibration by adjusting either transducer time delay (Tw) or path length of the flowmeter. The transducer delay time can be associated with the transducers 302, 304, 512, 514, 516, 518, etc. After in situ calibration, corrected sound speed from flow meter 202 (or 502) can be validated and recorded. If the difference is higher than the higher threshold, a "maintenance required" message can be sent to the user computing device 208 (or 508) for human intervention. For example, in situ calibration can be done by changing the pre-programmed path length or the transducer time delay (Tw) in the flow meter 202 (or 502). If the physical path length needs to be adjusted, "maintenance required" notification can be sent for human intervention.

In some implementations, the status can indicate that the flow meter is not operating as desired (e.g., sub-optimal operation) and/or an automatic diagnostic test is being performed or will be performed to calibrate the flow meter. This can be done, for example, when the difference (e.g., absolute difference) between the first speed of acoustic signal and calculated speed of sound (or the first speed difference and/or the second speed difference in the two channels of flow meter 502) lies in a predetermined range of values (e.g., between the lower threshold value and the higher threshold value). The computing device 204 (or 504) can execute one or more diagnostic tests when the difference in speed of the first acoustic signal and speed of sound lies in the predetermined range. For example, the computing device 204 (or 504) can execute a diagnostic test that can determine that the transducers in the flow meter are operating as desired. For some types of transducers, an echo self-diagnostic test can be performed to validate the transducer's performance. The instructions for the diagnostic test can be predetermined and can be stored in a storage device on the computing device 204 (or 504).

In some implementations, the computing device 204 (or 504) can vary the path length by varying the location/orientation of or more transducers in the flow meter. For example, the transducers (e.g., transducers 302, 304, 512, 514, 516, 518, etc.) can be mounted on actuators that can be controlled by the computing device 204 (or 504). The computing device 204 (or 504) can transmit a control signal to the actuator to move/re-orient the transducers. In some implementations, the control device 204 (or 504) can send a control signal to alter the operation of the transducers. For example, transducer operation can be improved (e.g., optimized) to maximize signal transmission. Computing device 204 (or 504) can estimate signal attenuation for any gas composition input from the analysis system 206 (or 506) and adjust the center frequency of the transmitted acoustic signal accordingly. By lowering transmitted signal frequency, transmission efficiency and signal amplitude can be improved for high attenuation gases, such as hydrogen or carbon dioxide. For low attenuation gases, such as heavy hydrocarbons at higher pressure, time resolution and measurement precision can be improved by raising transmitted signal frequency. Transmitted power intensity can also be altered to maximize signal amplitude when concentrations of gases with different attenuations change. Transducer signal shape and signal averaging can be improved (e.g., optimized) to improve signal quality.

In some implementations, the computing device 204 (or 504) can iteratively adjust the path length. For example, the computing device 204 (or 504) can change the path length (e.g., P, Q1, Q2, etc.) after detecting signal diagnostics of the first acoustic signal and/or second acoustic signal are acceptable (e.g., signal diagnostics do not have a predetermined value/range of values) and/or after comparing the first speed of the first acoustic signal and/or second acoustic signal with the calculated speed of sound. After the path length has been changed, the measurement and comparison steps can be repeated, which in turn can be followed by re-adjustment of the path length. These steps can be repeated until the difference between the speed of the first acoustic signal and the speed of sound is below a threshold value. The threshold values described above (e.g., higher threshold value, lower threshold value, etc.) can be depend on the velocity of fluid flowing throwing the pipe 250. For example, as the velocity of the fluid increases, the higher threshold value can increase, and the lower threshold value can decrease.

Returning to FIG. 1, at 106, a notification can be provided to the user (e.g., by the computing device 204) and/or saved to a data storage device. The notification can include the determined status of the flow meter (e.g., as described in step 104). The notification can be provided to a user-computing device 208 (e.g., cell phone, tablet, computer etc.). In some implementations, the notification can be curated for transmission at a later time. In some implementations, the status can indicate that the flow meter is operating as desired (e.g., when the difference between the speed of the first acoustic signal and the calculated speed of sound is below the lower threshold value). The notification can include the time of status determination, an identity of the flow meter (e.g., identity number associated with the flow meter), and the like.

The status can indicate that the flow meter requires maintenance (e.g., when signal diagnostics of the first acoustic signal are not acceptable (e.g., signal diagnostics do not have a predetermined value/range of values) and/or the difference between the speed of the first acoustic signal and the calculated speed of sound (or the first speed difference and/or the second speed difference in the two channels of flow meter 502) is above the upper threshold value. The notification can include a report having results of one or more diagnostic tests performed on the flow meter (e.g., defective transducer from an echo self-diagnostic test). The notification can also include the level of urgency associated with the maintenance request (e.g., high priority, low priority, etc.), previous maintenance work performed on the flow meter (e.g., time of previous maintenance, ID of personnel who performed the previous maintenance, etc.), and the like.

The status can indicate that the flow meter is not operating as desired (e.g., sub-optimal operation) and/or an automatic diagnostic test is being performed or will be performed to calibrate the flow meter (e.g. when signal diagnostics of the first acoustic signal are acceptable and the difference between the speed of the first acoustic signal and the calculated speed of sound [or the first speed difference and/or the second speed difference in the two channels of flow meter 502] is between the upper and lower threshold value). The notification can include the diagnostic steps taken/will be taken by the computing device to address an issue associated with the flow meter. The notification can include a diagnostic report on the electronics in the flow meter (e.g., transducer health). The notification can include differences between the speed of the first acoustic signal and the calculated speed of sound before and after the in situ calibration.

In some implementations, the status of the flow meter 502 can be determined by the computing device 504 based on the difference between the upstream and downstream time of travel (e.g., in the first channel, second channel, etc.), which in turn determines the fluid velocity. For example, the computing device 504 can calculate a first fluid velocity based on the time difference between the first upstream time of travel and the first downstream time of travel, and calculate a second fluid velocity based on the time difference between the second upstream time of travel and the second downstream time of travel. The computing device 504 can calculate a difference between the first fluid velocity and the second fluid velocity and determine if it is above a predetermined threshold value. This threshold value can depend on the geometric configuration of the two channels/paths being compared. If this difference is above a threshold value (e.g., higher threshold value), the status of the flow meter 502 can be set to indicate a maintenance request.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment, each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules, and/or by one or more other devices, instead of or in addition to the function performed at the particular module. Further, the modules can be implemented across multiple devices, and/or other components, local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
receiving data characterizing first signal diagnostics and data characterizing a first speed of a first acoustic signal through a gas mixture along a first path in a pipe, the first speed of the first acoustic signal detected by a first channel of an ultrasonic flow meter including a first pair of transducers that are separated by a first path length of the first path, wherein the gas mixture is configured to flow along a flow path in the pipe, further receiving data characterizing properties of the gas mixture, the properties comprising a composition of the gas mixture, a pressure of the gas mixture in the ultrasonic flow meter, and a temperature of the gas mixture;
determining a status associated with the ultrasonic flow meter based on the data characterizing the first signal diagnostics and a difference between the first speed of the first acoustic signal and a speed of sound, wherein the speed of sound is calculated based on the properties of the gas mixture, the speed of sound being calculated using a predetermined algorithm; and
adjusting over a predetermined range, based on the determined status, a time delay of the first pair of transducers to match the first speed of the first acoustic signal to the speed of sound being calculated using the predetermined algorithm within a predetermined threshold.

2. The method of claim 1, wherein the predetermined algorithm includes one or more of a molecular-weight based algorithm, an American Gas Association Report Number 10 (AGA10) method, and an ideal gas law.

3. The method of claim 1, wherein the status includes an identity of the ultrasonic flow meter.

4. The method of claim 1, wherein the data characterizing the first signal diagnostics includes one or more of the first path length, time delay of a first transducer and/or a second transducer of the first pair of transducers and a signal strength, and a signal-to-noise ratio, and
wherein the data characterizing the first speed of the first acoustic signal includes a first upstream time of travel of sound from the first transducer to the second transducer, and a first downstream time of travel of sound from the second transducer to the first transducer.

5. The method of claim 4, further comprising receiving data characterizing second signal diagnostics and data characterizing a second speed of a second acoustic signal through a gas mixture along a second path in the pipe, the second speed of the second acoustic signal detected by a second channel of the ultrasonic flow meter including a second pair of transducers that are separated by a second path length of the second path,
wherein the data characterizing the second signal diagnostics includes one or more of the second path length, time delay of a third transducer and/or a fourth transducer of the second pair of transducers, and a signal-to-noise ratio, and
wherein the data characterizing the second speed of the second acoustic signal includes a second upstream time of travel of sound from the third transducer to the fourth transducer, and a second downstream time of travel of sound from the fourth transducer to the third transducer.

6. The method of claim 5, wherein determining the status includes:
determining that one or more of the first signal diagnostics of the first acoustic signal has a first predetermined value, the second signal diagnostics of the second acoustic signal has a second predetermined value, the difference between the first speed of the first acoustic signal and the calculated speed of sound is above a higher threshold value, and a difference between the second speed of the second acoustic signal and the calculated speed of sound is above the higher threshold value; and
setting the status associated with the ultrasonic flow meter to indicate a maintenance request.

7. The method of claim 5, wherein determining the status includes:
determining that one or more of the first signal diagnostics of the first acoustic signal has a first predetermined value, the second signal diagnostics of the second acoustic signal has a second predetermined value, the difference between the first speed of the first acoustic signal and the calculated speed of sound is below a higher threshold value and above a lower threshold value, and a difference between the second speed of the second acoustic signal and the calculated speed of sound is below the higher threshold value and above the lower threshold value; and
setting the status associated with the ultrasonic flow meter to indicate that the ultrasonic flow meter requires calibration.

8. The method of claim 7, further comprising calibrating the ultrasonic flow meter by varying one or more of time delay of the first transducer and/or the second transducer, the first path length, time delay of the third transducer and/or the fourth transducer, and the second path length.

9. The method of claim 5, wherein determining the status includes:
determining that one or more of the first signal diagnostics of the first acoustic signal has a predetermined value, the difference between the first speed of the first acoustic signal and the calculated speed of sound is below a lower threshold value, and a difference between the second speed of the second acoustic signal and the calculated speed of sound is below the lower threshold value; and
setting the status associated with the ultrasonic flow meter to indicate that an ultrasonic flow meter performance has been validated.

10. The method of claim 5, wherein determining the status includes:
calculating a first velocity of fluid flow based on time difference between the first upstream time of travel and the first downstream time of travel;
calculating a second velocity of fluid flow based on time difference between the second upstream time of travel and the second downstream time of travel;

calculating a difference between the first fluid velocity and the second fluid velocity is above a higher threshold value; and setting the status associated with the ultrasonic flow meter to indicate a maintenance request.

11. The method of claim 5, wherein determining the status includes:
calculating a first velocity of fluid flow based on time difference between the first upstream time of travel and the first downstream time of travel;
calculating a second velocity of fluid flow based on time difference between the second upstream time of travel and the second downstream time of travel;
calculating a difference between the first fluid velocity and the second fluid velocity is below a lower threshold value; and
setting the status associated with the ultrasonic flow meter to indicate a successful in situ validation.

12. The method of claim 1, wherein the notification includes the determined status in a flare application or industrial process application.

13. A system comprising:
at least one data processor;
memory coupled to the at least one data processor, the memory storing instructions to cause the at least one data processor to perform operations comprising:
receiving data characterizing first signal diagnostics and data characterizing a first speed of a first acoustic signal through a gas mixture along a first path in a pipe, the first speed of the first acoustic signal detected by a first channel of an ultrasonic flow meter including a first pair of transducers that are separated by a first path length of the first path, wherein the gas mixture is configured to flow along a flow path in the pipe, further receiving data characterizing properties of the gas mixture, the properties comprising a composition of the gas mixture, a pressure of the gas mixture in the ultrasonic flow meter, and a temperature of the gas mixture;
determining a status associated with the ultrasonic flow meter based on the data characterizing the first signal diagnostics and a difference between the first speed of the first acoustic signal and a speed of sound, wherein the speed of sound is calculated based on the properties of the gas mixture, the speed of sound being calculated using a predetermined algorithm;
providing a notification including the determined status to a user and/or saving the notification to an electronic storage; and
modifying an operation of the ultrasonic flow meter based on the determined status, wherein the modifying comprises calibrating the ultrasonic flow meter by varying time delay of the first pair of transducers.

14. The system of claim 13, wherein the data characterizing the first signal diagnostics includes one or more of the first path length, time delay of a first transducer and/or a second transducer of the first pair of transducers and a signal strength, and a signal-to-noise ratio, and
wherein the data characterizing the first speed of the first acoustic signal includes a first upstream time of travel of sound from the first transducer to the second transducer, and a first downstream time of travel of sound from the second transducer to the first transducer.

15. The system of claim 14, wherein the operations further comprising receiving data characterizing second signal diagnostics and data characterizing a second speed of a second acoustic signal through a gas mixture along a second path in the pipe, the second speed of the second acoustic signal detected by a second channel of the ultrasonic flow meter including a second pair of transducers that are separated by a second path length of the second path,
wherein the data characterizing the second signal diagnostics includes one or more of the second path length, time delay of a third transducer and/or a fourth transducer of the second pair of transducers, and a signal-to-noise ratio, and
wherein the data characterizing the second speed of the second acoustic signal includes a second upstream time of travel of sound from the third transducer to the fourth transducer, and a second downstream time of travel of sound from the fourth transducer to the third transducer.

16. The system of claim 15, wherein determining the status includes:
determining that one or more of the first signal diagnostics of the first acoustic signal has a first predetermined value, the second signal diagnostics of the second acoustic signal has a second predetermined value, the difference between the first speed of the first acoustic signal and the calculated speed of sound is above a higher threshold value, and a difference between the second speed of the second acoustic signal and the calculated speed of sound is above the higher threshold value; and
setting the status associated with the ultrasonic flow meter to indicate a maintenance request.

17. The system of claim 15, wherein determining the status includes:
determining that one or more of the first signal diagnostics of the first acoustic signal has a first predetermined value, the second signal diagnostics of the second acoustic signal has a second predetermined value, the difference between the first speed of the first acoustic signal and the calculated speed of sound is below a higher threshold value and above a lower threshold value, and a difference between the second speed of the second acoustic signal and the calculated speed of sound is below the higher threshold value and above the lower threshold value; and
setting the status associated with the ultrasonic flow meter to indicate that the ultrasonic flow meter requires calibration.

18. The system of claim 17, wherein modifying the operation of the ultrasonic flow meter further comprises calibrating the ultrasonic flow meter by varying one or more of time delay of the first transducer and/or the second transducer, the first path length, time delay of the third transducer and/or the fourth transducer, and the second path length.

19. The system of claim 15, wherein determining the status includes:
determining that one or more of the first signal diagnostics of the first acoustic signal has a predetermined value, the difference between the first speed of the first acoustic signal and the calculated speed of sound is below a lower threshold value, and a difference between the second speed of the second acoustic signal and the calculated speed of sound is below the lower threshold value; and
setting the status associated with the ultrasonic flow meter to indicate that an ultrasonic flow meter performance has been validated.

20. The system of claim 15, wherein determining the status includes:
- calculating a first velocity of fluid flow based on time difference between the first upstream time of travel and the first downstream time of travel;
- calculating a second velocity of fluid flow based on time difference between the second upstream time of travel and the second downstream time of travel;
- calculating a difference between the first fluid velocity and the second fluid velocity is above a higher threshold value; and
- setting the status associated with the ultrasonic flow meter to indicate a maintenance request.

21. The system of claim 15, wherein determining the status includes:
- calculating a first velocity of fluid flow based on time difference between the first upstream time of travel and the first downstream time of travel;
- calculating a second velocity of fluid flow based on time difference between the second upstream time of travel and the second downstream time of travel;
- calculating a difference between the first fluid velocity and the second fluid velocity is below a lower threshold value; and
- setting the status associated with the ultrasonic flow meter to indicate a successful in situ validation.

* * * * *